US012613308B2

(12) United States Patent
Bakro

(10) Patent No.: US 12,613,308 B2
(45) Date of Patent: Apr. 28, 2026

(54) RADAR SYSTEM FOR A VEHICLE

(71) Applicant: Aptiv Technologies AG, Schaffhausen (CH)

(72) Inventor: Manar Bakro, Cologne (DE)

(73) Assignee: Aptiv Technologies AG, Schaffhausen (CH)

( * ) Notice: Subject to any disclaimer, the term of this patent is extended or adjusted under 35 U.S.C. 154(b) by 294 days.

(21) Appl. No.: 18/137,503

(22) Filed: Apr. 21, 2023

(65) Prior Publication Data

US 2024/0004026 A1 Jan. 4, 2024

(30) Foreign Application Priority Data

May 27, 2022 (EP) .................................... 22175768

(51) Int. Cl.
*G01S 7/03* (2006.01)
*G01S 13/931* (2020.01)

(52) U.S. Cl.
CPC ............. *G01S 7/032* (2013.01); *G01S 13/931* (2013.01)

(58) Field of Classification Search
CPC ........ G01S 7/023; G01S 7/032; G01S 13/931; G01S 7/02; G01S 7/282; H01Q 1/3233; H01Q 1/528; H01Q 1/42; H01Q 1/422; H01Q 1/425; H01Q 15/0006; H01Q 15/0013; H01Q 15/0026; H01Q 15/0073
See application file for complete search history.

(56) References Cited

U.S. PATENT DOCUMENTS

| | | | | | |
|---|---|---|---|---|---|
| 4,176,358 | A * | 11/1979 | Wood | H01Q 5/45 | 343/781 CA |
| 5,057,842 | A * | 10/1991 | Moller | H01Q 15/0006 | 342/4 |
| 5,204,680 | A * | 4/1993 | Allington | H01Q 15/0006 | 342/6 |
| 5,606,335 | A * | 2/1997 | English | H01Q 15/0053 | 343/753 |
| 6,285,332 | B1 * | 9/2001 | Chandler | H01Q 19/195 | 343/756 |
| 6,496,138 | B1 * | 12/2002 | Honma | H01Q 19/08 | 343/873 |
| 8,013,775 | B2 * | 9/2011 | Woods | H01Q 17/008 | 342/4 |
| 8,878,743 | B1 * | 11/2014 | Buchanan | H01Q 19/19 | 343/837 |
| 10,128,576 | B2 * | 11/2018 | Watts | H01Q 15/14 | |

(Continued)

OTHER PUBLICATIONS

Extended European Search Report issued by the European Patent Office in connection with International Application No. 22175768.5, dated Nov. 16, 2022.

*Primary Examiner* — Peter M Bythrow
(74) *Attorney, Agent, or Firm* — Harness, Dickey & Pierce, P.L.C.

(57) ABSTRACT

The present disclosure relates to a radar system featuring a reduced radio cross-section (RCS). This is achieved by providing a radar system comprising one or more antenna structures and a spatially modulated surface structure, wherein the spatially modulated surface structure is configured to generate, from incident radar waves, a first portion of reflected waves and a second portion of reflected waves, wherein the first portion of reflected waves is out of phase in relation to the second portion of reflected waves.

16 Claims, 8 Drawing Sheets

(56) References Cited

U.S. PATENT DOCUMENTS

| | | | | |
|---|---|---|---|---|
| 12,253,623 | B2 * | 3/2025 | Brown | H01Q 1/421 |
| 2001/0028328 | A1 * | 10/2001 | Stjernman | H01Q 15/0013 343/832 |
| 2004/0036645 | A1 * | 2/2004 | Fujieda | H01Q 1/421 342/72 |
| 2006/0044189 | A1 * | 3/2006 | Livingston | H01Q 19/005 343/700 MS |
| 2007/0241962 | A1 * | 10/2007 | Shinoda | H01Q 1/425 342/361 |
| 2009/0079645 | A1 * | 3/2009 | Sotelo | H01Q 15/0046 343/912 |
| 2011/0115584 | A1 * | 5/2011 | Kiji | H01Q 15/0013 333/81 R |
| 2014/0091969 | A1 * | 4/2014 | Shi | G01S 13/02 342/385 |
| 2015/0084803 | A1 * | 3/2015 | Purden | H01Q 17/00 342/385 |
| 2015/0084835 | A1 * | 3/2015 | Snyder | H01Q 15/0013 343/909 |
| 2017/0346179 | A1 * | 11/2017 | Wu | H01Q 1/523 |
| 2020/0259270 | A1 * | 8/2020 | Herscovici | H01Q 15/0026 |
| 2020/0393537 | A1 * | 12/2020 | Tanaka | G01S 7/354 |
| 2021/0041529 | A1 * | 2/2021 | Brown | G01S 7/03 |
| 2021/0135373 | A1 * | 5/2021 | Spielmann | H01Q 13/10 |
| 2022/0037797 | A1 * | 2/2022 | Hamberger | H01Q 15/14 |
| 2024/0145929 | A1 * | 5/2024 | Miyazaki | H01Q 15/0013 |
| 2024/0310713 | A1 * | 9/2024 | Miura | G03B 21/62 |

* cited by examiner

RADAR SYSTEM FOR A VEHICLE

CROSS-REFERENCE TO RELATED APPLICATION

This application claims the benefit of European patent application serial number EP 22175768.5 filed on May 27, 2022. The entire contents of which are hereby incorporated by reference herein.

TECHNICAL FIELD

The present disclosure generally relates to a radar system and a vehicle comprising a radar system. Specifically, the present disclosure relates to a radar system with a reduced radar cross section (RCS).

BACKGROUND

Advanced Driver Assistance Systems (ADAS) and Automated Driving Systems (ADS) may be used to control the steering of a vehicle. Such ADAS/ADS do require sensory input to respond to the surroundings of the vehicle. Therefore, a radar may be mounted to the vehicle to scan part of or the entire periphery surrounding the vehicle for objects.

Specifically, the radar may be mounted to the vehicle behind the facia, bumper or chassis of a vehicle to face in a forward or reverse driving direction or a direction sideways or inclined to the driving direction. It is also possible to install the radar in a radar dome or "Radome" mounted to the vehicle to scan the entire surrounding periphery of the vehicle. Based on the radar scanning, ADAS/ADS can determine control instructions, e.g. to avoid obstacles or other road users.

To meet the requirements of ADAS/ADS special radar radiation patterns are needed (e.g. to achieve a certain width, depth or resolution of the radar scan). Such special radar radiation patterns can be achieved by increasing the number of antennas amounted on an antenna board or printed circuit board (PCB) used as or in a radar system.

SUMMARY

The present disclosure relates to a radar system featuring a reduced radio cross-section (RCS). This is achieved by providing a radar system comprising one or more antenna structures and a spatially modulated surface structure, wherein the spatially modulated surface structure is configured to generate, from incident radar waves, a first portion of reflected waves and a second portion of reflected waves, wherein the first portion of reflected waves is out of phase in relation to the second portion of reflected waves.

DETAILED DESCRIPTION OF EMBODIMENTS

Figure 1:
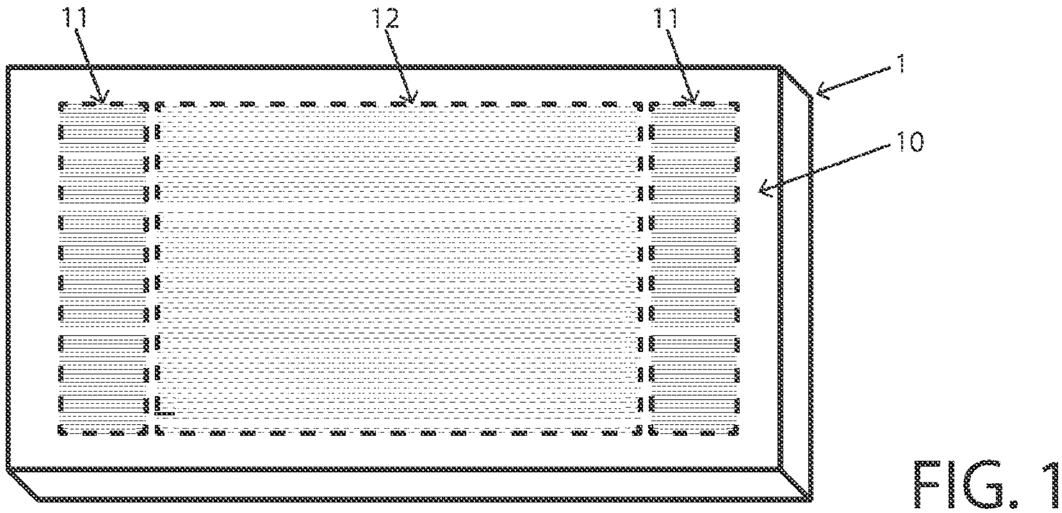
FIG. 1 illustrates an example of a radar system according to embodiments of the present disclosure.

Radar systems meeting the resolution, depth and accuracy requirements of ADAS/ADS require a number of antenna elements which leads to an increased Radar Cross Section (RCS) of the radar system. Since radar waves emitted from the radar propagate through nearby parts (e.g. the fascia, bumper, chassis or "Radome") reflections from such parts occur. Such reflections may negatively affect the accuracy of the antenna elements e.g. may be perceived as noise.

Existing techniques exist and reduce reflections between the radar system and nearby parts e.g. by applying Meta surfaces or Perfect Absorber Materials (PAMs) to the nearby parts. This solution has a low frequency bandwidth and a high sensitive to the nearby parts which shift the frequency resonance of the Meta surface away from the targeted frequency. The radar system may also be tilted relative to surfaces of nearby parts. In view of a plurality of nearby parts, it is difficult to avoid a surface orientated parallel to the radar system. Also, this solution requires more space for mounting the radar system and is highly sensitive to manufacturing tolerances (both in manufacture of the Meta surface of PAMs, and in positioning/orientation thereof).

In view of these technical problems, the present disclosure aims to reduce the RCS of the radar system to reduce reflections between the radar system and nearby parts.

The present disclosure according to the independent claims solves this technical problem. The dependent claims describe further preferred embodiments.

Specifically, a radar system is provided and comprises one or more antenna structures and a spatially modulated surface structure (SMSS), wherein the spatially modulated surface structure is configured to generate, from incident radar waves, a first portion of reflected waves and a second portion of reflected waves, wherein the first portion of reflected waves is out of phase in relation to the second portion of reflected waves.

By providing the radar system with a spatially modulated surface structure having the property of reflecting incident radar waves as out-of-phase reflected waves, reflections of the radar system and seen at the antenna element are reduced (e.g. destructive superposition). This includes both monostatic reflections e.g. reflections are parallel to the direction of the incident wave and bistatic reflections e.g. reflections are scattered in direction/s different to the incident wave. Hence, the power of the reflected radar waves is reduced compared to the incident radar waves, whereby a reduced RCS is achieved. As a result, reflections between nearby parts and the radar system are reduced, thereby reducing noise and improving the accuracy of the radar system. The sensitivity to manufacturing tolerance, compared to Meta surfaces and PAMs, is also lower when implementing a spatially modulated surface structure according to embodiments of the present disclosure.

With reference to the enclosed drawings, in the following preferred embodiments of the present disclosure are described in detail. In the following reference is made to the drawings by use of reference signs. Components designated by the same reference sign are essentially the same and a repeated description thereof is omitted for sake of conciseness.

A radar system according to an embodiment comprises at least one antenna structure 11 and at least one spatially modulated surface structure 12. Herein, the spatially modulated surface structure 12 is configured to generate, from incident radar waves 2*a*, a first portion of reflected waves 2*b*1, 2*c*1, 2*d*1 and a second portion of reflected waves 2*b*2, 2*c*2, 2*d*2, wherein the first portion of reflected waves 2*b*1, 2*c*1, 2*d*1 is out of phase (or has a direct opposite phase) in relation to the second portion of reflected waves 2*b*2, 2*c*2, 2*d*2 (e.g. along a predetermined direction).

If the antenna structure/s 11 and the spatially modulated surface structure/s 12 are provided on the same surface 10 of the antenna board 1, they may be provided at different areas of the of the surface. As a specific example, the structures 11, 12 may be provided on a surface 10 of an antenna board 1 (e.g. a PCB) as illustrated in FIG. 1. Herein, the non-overlapping areas for the antenna structure 11 and the spatially modulated surface structure 12 are shaded differently. Herein, the area not occupied by the antenna structure/s 11, e.g. the "free area", may be fully or partially covered by the spatially modulated surface structure/s 12.

In FIG. 1, the antenna board 1, the antenna structures 11 and the spatially modulated surface structure 12 are illustrated as having a rectangular shape. However, the number of the structures, the location thereof and the shape of the antenna board and the structures may vary (e.g. according to the intended application of the radar system) and is not limited to a rectangular shape. For example, the spatially modulated surface structure 12 may be applied to an area surrounding an antenna structure 11. For example, the spatially modulated surface structure 12 may be distributed over the entire surface 10 in a manner to fill the area not occupied by antenna structure/s 11 (e.g. the "free area"). For example, the spatially modulated surface structure 12 may be located on a surface different to where the antenna structure 11 is located (e.g. on a bottom surface on the underside of the antenna board 1 in FIG. 1). For example, the spatially modulated surface structure 12 may be located on a surface of a different board (e.g. an antenna board (e.g. antenna PCB) or an electronics board (e.g. electronics PCB) provided in proximity to an antenna structure) that may be part of the radar system. By any of such (combinable) configurations, reflections and the RCS of the radar system can be reduced.

Out-of-phase reflections may be generated by the spatially modulated surface structure 12 by reflecting incident waves in such a manner, that a first portion of reflected waves is reflected with a phase shift of e.g. 180°, 540°, 900° etc. (or $\pi$, $3\pi$, $5\pi$ etc.) in comparison to a second portion of reflected waves. Thereby, the two reflected portions superimpose in a destructive manner, e.g. to cancel out each other.

Figure 9:
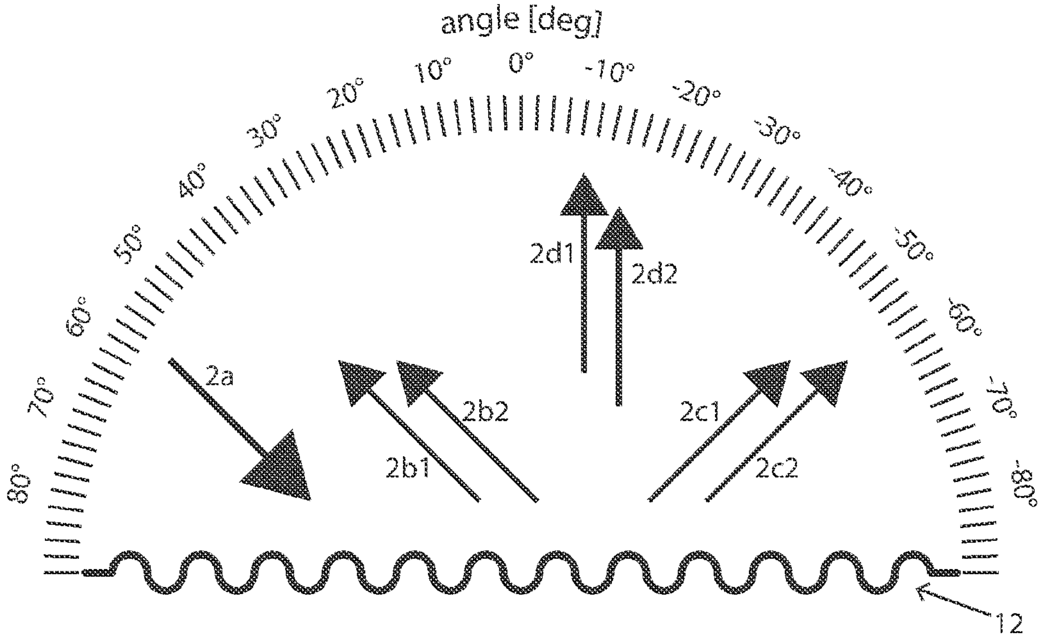
FIG. 9 illustrates an example of out-of-phase reflections.

For better explanation of what an out-of-phase reflection means, reference is made to FIG. 9. In this example, incident waves 2*a* are incident with an (azimuth) angle of around 45°, relative to the normal of the surface of a board with a spatially modulated surface structure 12 (e.g. with reference to FIG. 6C, the normal may be the Y-axis and the angle may be an (azimuth) angle measured from the Y-axis towards the X-axis). The angle of the indicant waves 2*a* is, however, not limited thereto and (as will be described below) may be any incident angle between and including ±90° about the normal.

In FIG. 9 an exemplified spatially modulated surface structure 12 is illustrated in bold.

When waves 2*a* are incident on the spatially modulated surface area 12, the incident waves 2*a* may be reflected in a monostatic manner. This may result in reflected waves 2*b* containing a first portion of reflected waves 2*b*1 and a second portion of reflected waves 2*b*2 propagating in a direction parallel to the direction of the incident waves 2*a*. Additionally or alternatively, the incident waves 2*a* may be reflected in a bistatic manner. This may result in reflected waves 2*c*, 2*d* containing a first portion of reflected waves 2*c*1, 2*d*1, and/or a second portion of reflected waves 2*c*2, 2*d*2 propagating in a direction not parallel to the direction of the incident waves 2*a*. In this example, the waves reflected in a bistatic manner are shown to propagate in a direction of −45° and 0° relative to the normal. However, based on the shape of the spatially modulated surface structure 12, the direction in which waves reflected in such a manner may propagate may vary. That is to say, the term bistatic reflection is not limited to a mirror-like reflection, but also refers to other reflected waves like the reflected waves 2*d*.

Nonetheless, as described above, the reflected waves of at least one the first portions 2*b*1, 2*c*1, 2*d*1 are phase shifted by the spatially modulated surface structure 12 in comparison to the reflected waves of the respective at least one of the second portions 2*b*2, 2*c*2, 2*d*2 so as to interfere therewith in a destructive manner, e.g. to cancel out with each other.

Therefore, as a further preferred embodiment, the first portion of the reflected radio waves 2*b*1, 2*c*1, 2*d*1 may be reflected $(2n-1)\times 90°$ to $(2n-1)\times 180°$ out of phase compared to the second portion of the reflected radio waves 2*b*2, 2*c*2, 2*d*2, where $n \in \mathbb{Z}^+$. Herein, the phase shift needs not be exactly 180° but may have a tolerance of e.g. ±5°.

Also, as an example, an amplitude (or power) of the first portion of reflected radio waves 2*b*1, 2*c*1, 2*d*1 may be (close to) equal to an amplitude (or power) of the second portion of reflected radio waves 2*b*1, 2*c*2, 2*d*2. After all, when powers of the first portion and the second portion of the reflected waves essentially match, they can cancel out with each other.

Figure 8A:
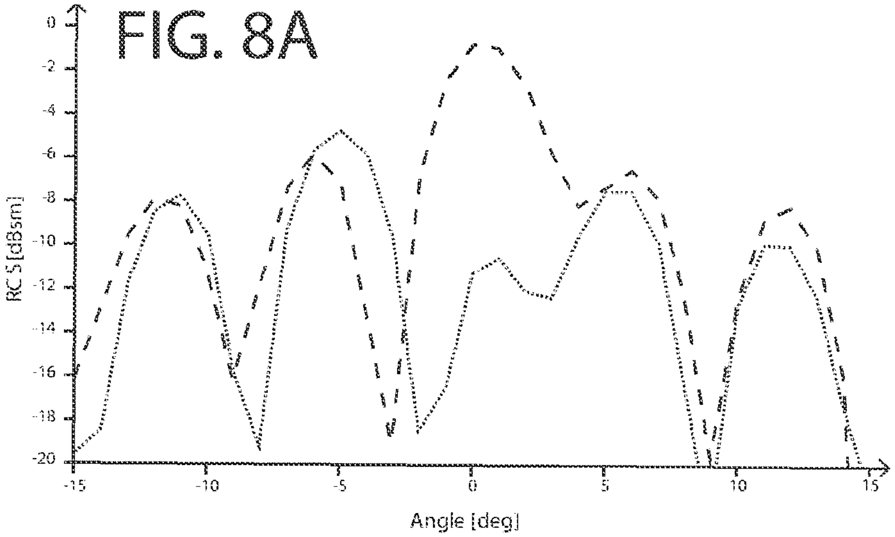
FIGS. 8A to 8C illustrate examples of intensities of reflections from a radar system according to embodiments of the present disclosure.
Figure 8B:
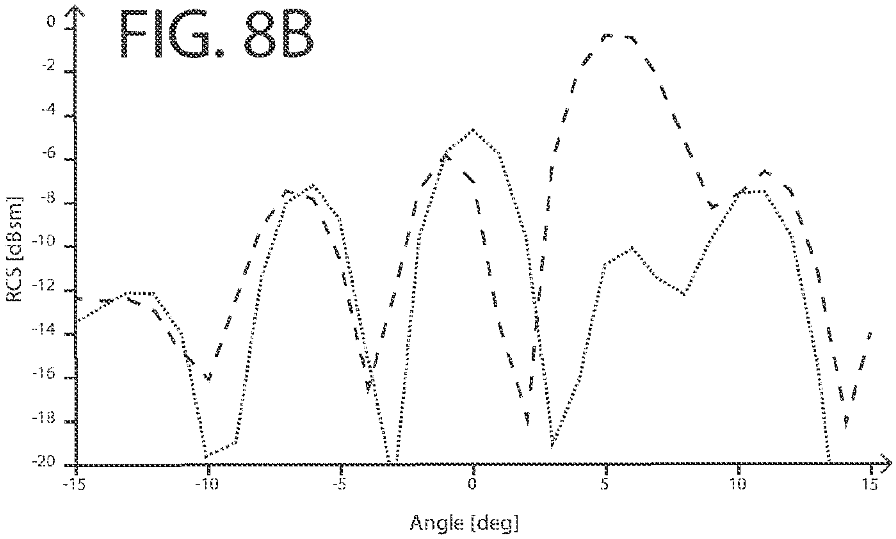
Figure 8C:
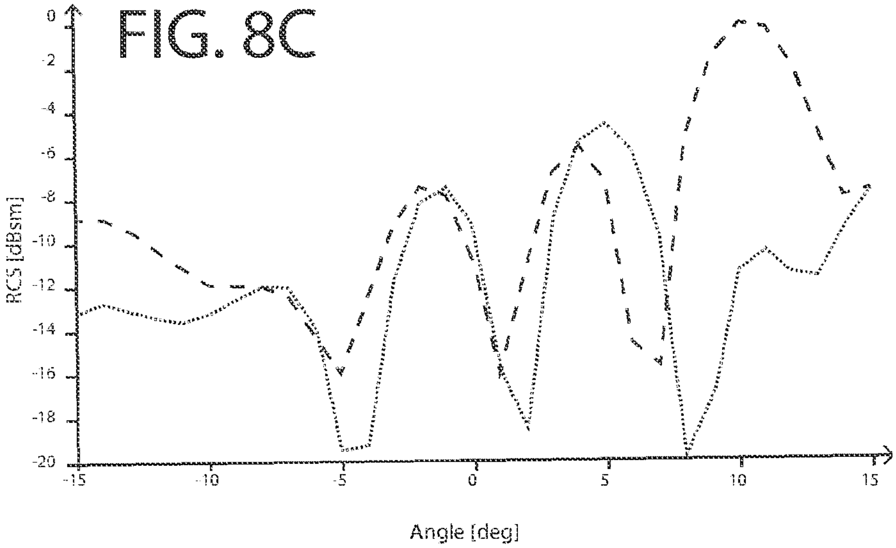

For better explanation of the technical effect provided by the spatially modulated surface structure 12, reference is made to FIGS. 8A to 8C and FIG. 9. FIGS. 8A to 8C illustrate graphs of the intensities of reflected waves. Specifically, they illustrate not the individual portions of the reflected wave, but the total power (e.g. after destructive interference) of the reflected waves. The angle on the X-Axis of FIGS. 8A to 8C corresponds to the in angle in FIG. 9 and provides an indication of a direction of the reflected wave.

In these graphs, the dashed lines indicate reflected power observed at different angles from a reference radar system (e.g. only featuring an antenna structure 11 and not featuring the spatially modulated surface structure 12) and the dotted lines indicate reflected power observed at different angles from a radar system according to an embodiment of the present disclosure. From FIG. 8A to 8C, incident waves 2*a* are set up to be incident with an angle of 0°, −5° and −10°, respectively. In FIG. 8A to 8C it can be observed that wave power of waves reflected in a monostatic manner is significantly reduced by the radar system according to an embodiment of the present disclosure in comparison to the reference radar system. A detailed explanations of FIG. 8A to 8C is provided below.

FIG. 8A represents the case, where incident waves 2*a* are set up with an incident angle of 0° (i.e. perpendicular to the surface 10 or parallel to the normal of the surface). Whilst the reference radar system (dashed line) comprising only the antenna structure 11 produces significant monostatic reflections around 0° and several bistatic reflections at sidebands around ±6° and ±12°, the radar system according to an embodiment of the present disclosure (dotted line) significantly reduces monostatic reflections, i.e. by about 10-11 dBsm (or $dBm^2$). Here, bistatic reflections are impacted less. However, since monostatic reflections contribute the majority of reflected power (i.e. dBsm is a logarithmic scale), the significant reduction of monostatic reflections outweighs the lack of impact on bistatic reflections or a worsening thereof.

FIG. 8B represents the case, where incident radar waves are at an incident angle of −5° (i.e. −5° offset in relation to the normal of the surface 10 of the radar system). Here, reflections around +5° by a radar system according to an embodiment of the present disclosure (i.e. dotted line) are significantly reduced, e.g. by about 9-10 dBsm, in comparison to reflections around +5° by the reference system (i.e. dashed line).

FIG. 8C represents the case, where incident radar waves are at an incident angle of −10° (i.e. −10° offset in relation to the normal of the surface 10 of the radar system). Here, reflections around +10° by a radar system according to an embodiment of the present disclosure (i.e. dotted line) are significantly reduced, e.g. by about 9-10 dBsm, in comparison to reflections around +10° by the reference system (i.e. dashed line).

The examples of FIG. 8A to 8C illustrate the technical effect of a reduction in reflected power (e.g. a reduced RCS).

Figure 5A:
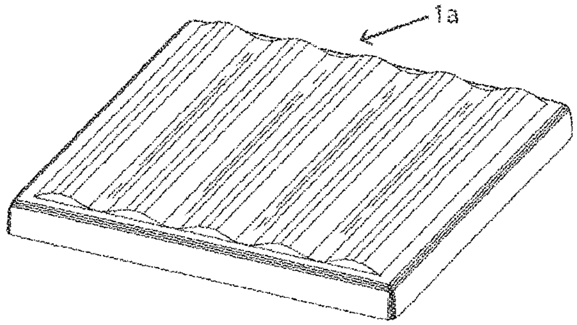
FIGS. 5A to 5C illustrate an example of a radar system according to embodiments of the present disclosure, wherein a wave-like pattern is applied.
Figure 5B:
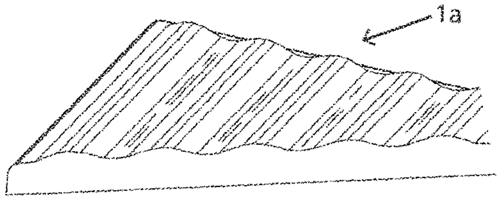

Examples of the geometry of a radar system according to embodiments of the present disclosure are illustrated in FIGS. 5A to 7C. In FIGS. 5A, 6A and 7A a board 1*a*, 1*b*, 1*c* is illustrated only comprising a spatially modulated surface structure 12. In FIGS. 5B, 6B and 7B respectively illustrate version of the board 1*a*, 1*b*, 1*c* that is cut in half to better visualize the configuration of the spatially modulated surface structure 12. Such a board 1*a*, 1*b*, 1*c* may be provided as part of a radar system, where antenna structures 11 are located on a different board. This may be preferable, e.g. when tiling the entire radar system as multiple smaller boards that constitute a larger surface of the radar system. Also, it may be possible that the underside of the board 1*a*, 1*b*, 1*c* is fully occupied by antenna structures 11, which is why the side visible in FIGS. 5A, 6A and 7A may be fully occupied by the spatially modulated surface structure 12. That is to say, it is not essential to contain both antenna structures 11 and the spatially modulated surface structure 12 on the same board or on the same side of same board. Instead an arrangement of the antenna structures 11 and the spatially modulated surface structure 12 in relation to each other and as part of the same radar system is sufficient.

Figure 6A:
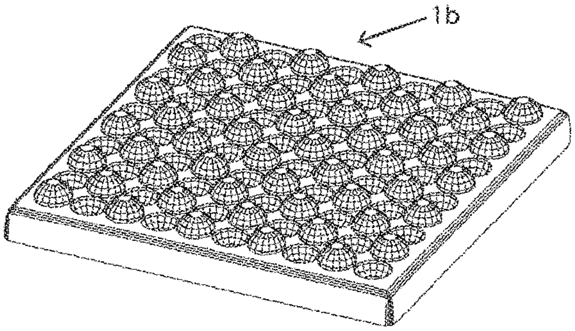
FIGS. 6A to 6C illustrate an example of a radar system according to embodiments of the present disclosure, wherein a pattern of convex and concave hemispheres is applied.
Figure 6B:
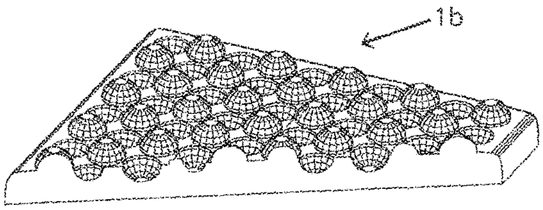
Figure 7A:
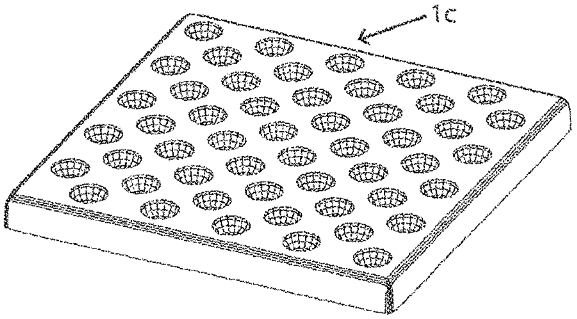
FIGS. 7A to 7C illustrate an example of a radar system according to embodiments of the present disclosure, wherein a pattern of concave hemispheres is applied.
Figure 7B:
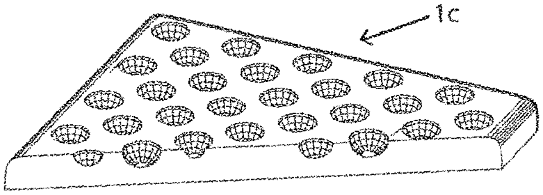
Figure 5C:
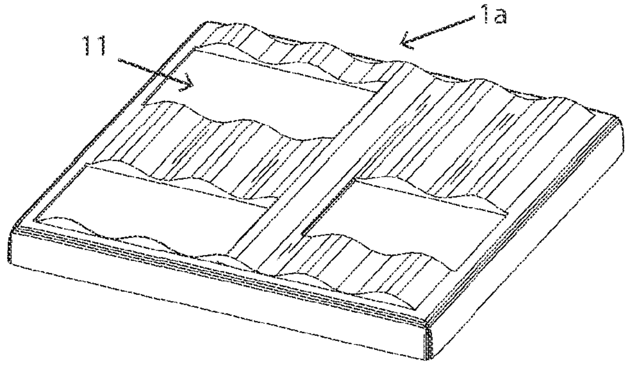
Figure 6C:
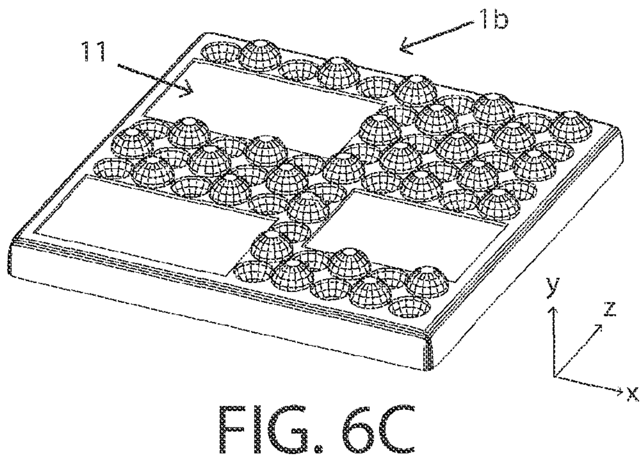
Figure 7C:
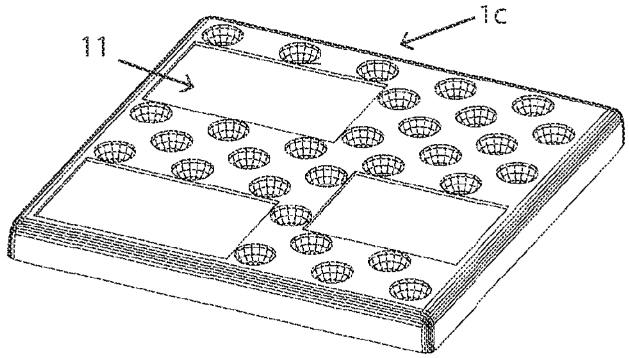

However, when arranging antenna structure/s 11 and the spatially modulated surface structure 12 on the same antenna board, it is preferable that they do not overlap with each other. This is illustrated in the examples of FIGS. 5C, 6C and 7C. Herein, the configuration of the antenna structures 11 is omitted and a plane region is illustrated only. This is to say that the exact geometry, shape and size of the antenna structure 11 is not essential to the geometry of the spatially modulated surface structure 12. In this example, the spatially modulated surface structure 12 may only not overlap with the antenna structures 11.

Also, if the spatially modulated surface structure 12 is arranged on an antenna board 1, other components of the antenna board 1 like waveguides, mounting holes or mounting recesses may also impact the arrangement of the spatially modulated surface structure 12. That is to say, the spatially modulated surface structure 12 may be arranged on the antenna board 1 in such a manner, that it does not interfere with the intended operation of the antenna board 1.

For a better explanation of the spatially modulated surface structure 12, in the following, some exemplifying shapes thereof are described. However, the exact shape of the spatially modulated surface structure 12 is not limited thereto, as long as it produces out-of-phase reflections as described above.

Hence, as a further preferred embodiment, the spatially modulated surface structure 12 may comprise a plurality of elements, protruding and/or receding from a baseline surface 10 of the radar system. Herein, the baseline surface 10 may be an average height of the spatially modulated surface structure 12, a virtual surface onto which elements constituting the spatially modulated surface structure 12 are provided or from which parts are removed to produce the spatially modulated surface structure 12. For convenience, this "baseline surface" may also be referred to as "surface". Put differently, each of the elements may protrude or recede the baseline surface 10 (of any board) of the radar system. Examples thereof are illustrated in FIGS. 2A to 2D. These shapes may be observed when vertically cutting a board 1 of a radar system (e.g. as illustrated in FIG. 1) in two pieces.

In these examples, the spatial dimension of the plurality of elements may be a height dimension h and/or a width dimension b, wherein the height dimension may extend perpendicular to the (baseline) surface 10 of the board 1 of the radar system and the width dimension may extend parallel to the (baseline) surface 10.

Figure 2A:
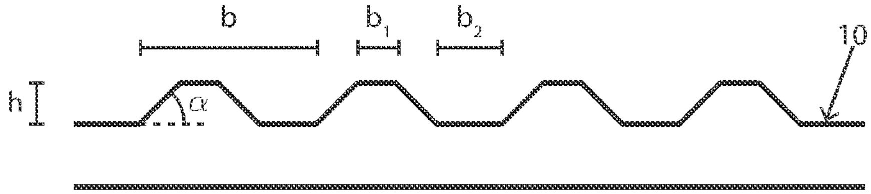
FIGS. 2A to 2D illustrate examples of differently shaped cross-sections of a radar system according to embodiments of the present disclosure.

As one example, FIG. 2A depicts a cross-sectional shape of the spatially modulated surface structure 12 as a trapezoidal, with an inclination angle ∝ of roughly 45°. This inclination angle ∝ is, however, not limited thereto and may be varied from 100 (e.g. resulting in gradually inclined trapezoids) to 90° (e.g. resulting in a cross-section shaped like a square-wave). Also, the width dimensions b, $b_1$, $b_2$ and/or the height dimension h may be the dimension/s chosen to achieve the out-of-phase reflections as described above. Specifics regarding the dimension (including height dimension h and/or width dimension b) are described later.

Figure 2B:
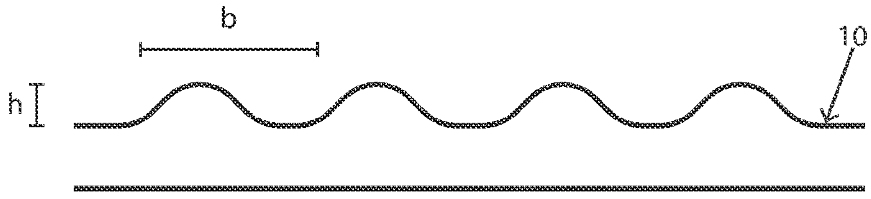

As another example, FIG. 2B depicts a cross-sectional shape of the spatially modulated surface structure 12 as a sinusoid. This sinusoidal shape may be used to form wave-like pattern as the spatially modulated surface structure 12 (e.g. when extended in a depth dimension not illustrated in the figure) or to form sinusoidal bumps and recesses distributed over the surface 10 of the spatially modulated structure 12 (e.g. when repeated in a depth dimension not illustrated in the figure). Herein, the width dimension b and/or the height dimension h may be the dimension/s chosen to achieve the out-of-phase reflections as described above. Specifics regarding the dimension (including height dimension h and/or width dimension b) are described later.

Figure 2C:
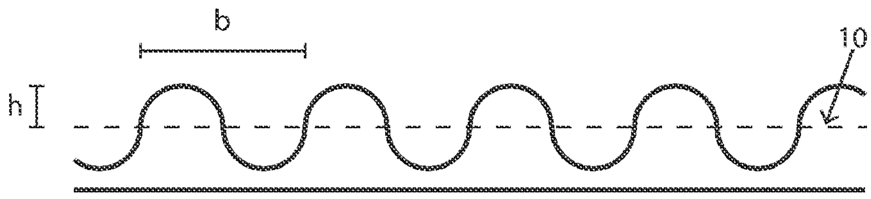

As another example, FIG. 2C depicts a cross-sectional shape of the spatially modulated surface structure 12 constituted by semi-circles protruding and receding relative to the surface 10 of the radar system. As will be described later, these semi-circles may be used to form wave-like patterns as the spatially modulated surface structure 12 (e.g. when extended in a depth dimension not illustrated in this figure) or convex/concave hemispheres (e.g. when repeated in a depth dimension not illustrated in the figure). Although both protruding and receding semi-circles are depicted in FIG. 2C, only protruding or only receding semi-circles may be provided, as this reduces the complexity of production.

Figure 2D:
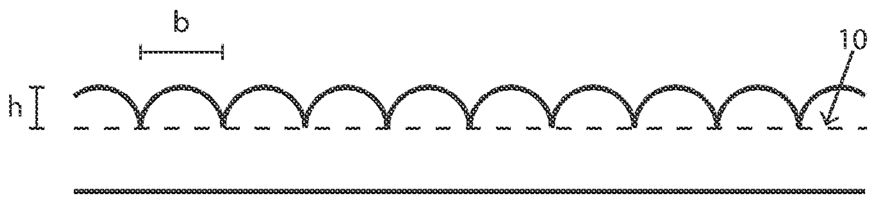

Although there may be a flat part provided over the surface 10 between two neighboring semi-circles, they may also be in contact with each other (e.g. as illustrated in FIG. 2D for only protruding semi-circles). Herein, the width dimension b and/or the height dimension h may be the dimension/s chosen to achieve the out-of-phase reflections as described above. Specifics regarding the dimension (including height dimension h and/or width dimension b) are described later.

The exact dimensioning of the elements of the spatially modulated surface structure 12 preferably may be based on the wavelength λ of the waves emitted by the antenna structure 11. Hence, as a further preferred embodiment, the antenna structure 11 may be configured for emitting a signal of a predefined wavelength, λ and a spatial dimension of the plurality of elements may be (within) $(2n-1)\times\lambda/2$ where $n\in\mathbb{Z}^+$.

Put differently, the (spatial) dimension of each of the elements may preferably be based on the wavelength λ used by the antenna structure 11. Specifically, the dimension may be a size such that the out-of-phase reflections (as described above) are achieved by the protrusions and/or recessions of the surface 10 of the board 1 of the radar system. This means, a λ/2 or "half-lambda" dimension may be used.

However, the dimension is not limited to exactly λ/2 but may be offset by λn, where n is a positive integer not including zero (i.e. being part of all positive integers $\mathbb{Z}^+$). As a result conceivable dimensions may be found by $(2n-1)\times\lambda/2$ where $n\in\mathbb{Z}^+$. Also, different integers n may be chosen for elements of the spatially modulated surface structure 12. Whilst using the same dimensioning for the elements would result in a regularly shaped spatially modulated surface structure 12, using different dimensioning for the elements would result in an irregularly shaped spatially modulated surface structure 12. In either case, out-of-phase reflections can be achieved.

For example, the antenna structure 11 may be a radar antenna structure for operating in a frequency band between 76 GHz and 81 GHz. In this case, the dimension may be 1 mm or more and 4 mm or less.

As a further preferred embodiment, each of the plurality of elements may have a predetermined shape that alternates and/or repeats along a predetermined direction on the (baseline) surface 10 of the radar system. Put differently, shapes of the plurality of elements may be alternated and/or repeated in a direction $d_1$, $d_2$ parallel to the (baseline) surface 10 (e.g. of the board 1) of the radar system. This means, the three dimensional pattern of the spatially modulated surface structure 12 may be constituted by extended, repeated and/or alternated cross-sectional shapes 121, 122 akin to those depicted in FIGS. 2A to 2D. Herein, the repetitions may be regular or irregular and the shapes may be scaled and/or combined to obtain an even more irregularly shaped spatially modulated surface structure 12.

When alternating the shape of the plurality of elements, the shape for each element may (repetitively) switch e.g. between a concave and a convex hemisphere (e.g. as depicted in FIG. 4B or 5A to 5C). As a result, the spatially modulated surface structure 12 may be provided with alternating elements (e.g. alternating hemispheres). However, the alternating is not limited to hemispheres and any combination of shapes may be used.

Also, when using elements of two different shapes, one group of the elements may be of a first shape and another group of the elements may be of a second shape. As the number of used shapes increases, the number of groups may increase accordingly. Also, the number of elements per group may be equal (e.g. an equal 50:50 distribution) or it may be unequal.

The dimension of the plurality of elements may be a height dimension h and/or a width dimension b, wherein the height dimension may extend perpendicular to the (baseline) surface 10 of the radar system and wherein the width dimension may extend parallel to the (baseline) surface 10 of the radar system.

To better exemplify the dimensioning of such shapes, in FIGS. 3A to 4B, a plurality of elements are depicted with a cross-sectional shape 121, 122 on a plane P extending in a height direction $d_h$ perpendicular to the surface 10 of the radar system and in a first direction $d_1$ parallel to the surface 10 of the radar system, wherein the cross-sectional shape 121, 122 is extended or repeated in a second direction $d_2$ parallel to the surface of the radar system.

Figure 3A:
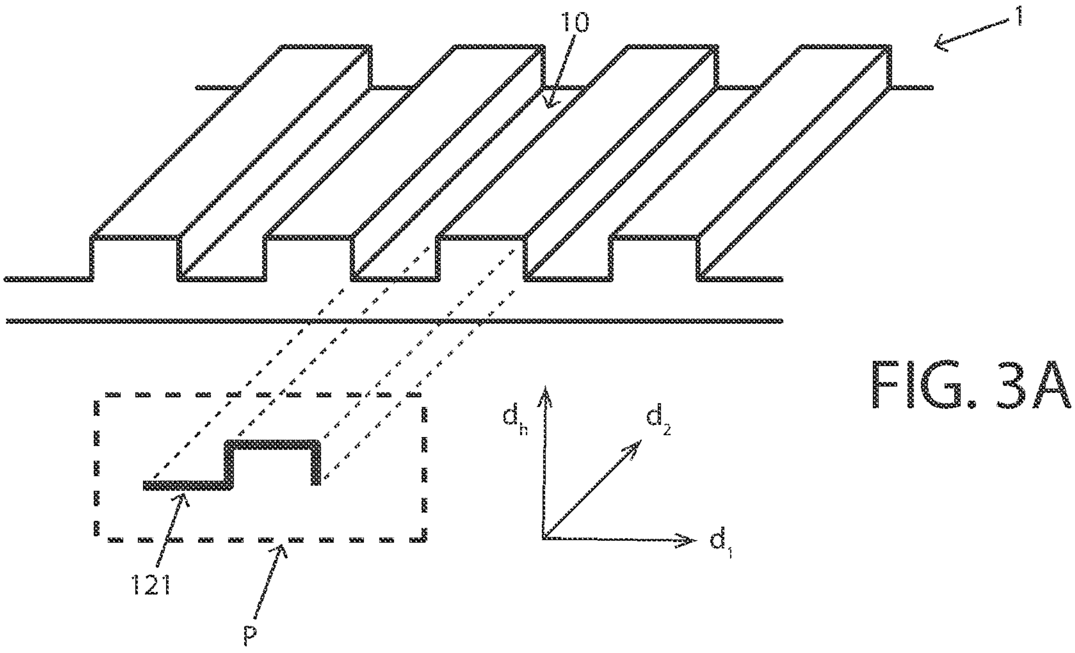
FIGS. 3A and 3B illustrate examples of radar systems according to embodiments of the present disclosure, wherein the surface structure is one-dimensionally repeated.
Figure 3B:
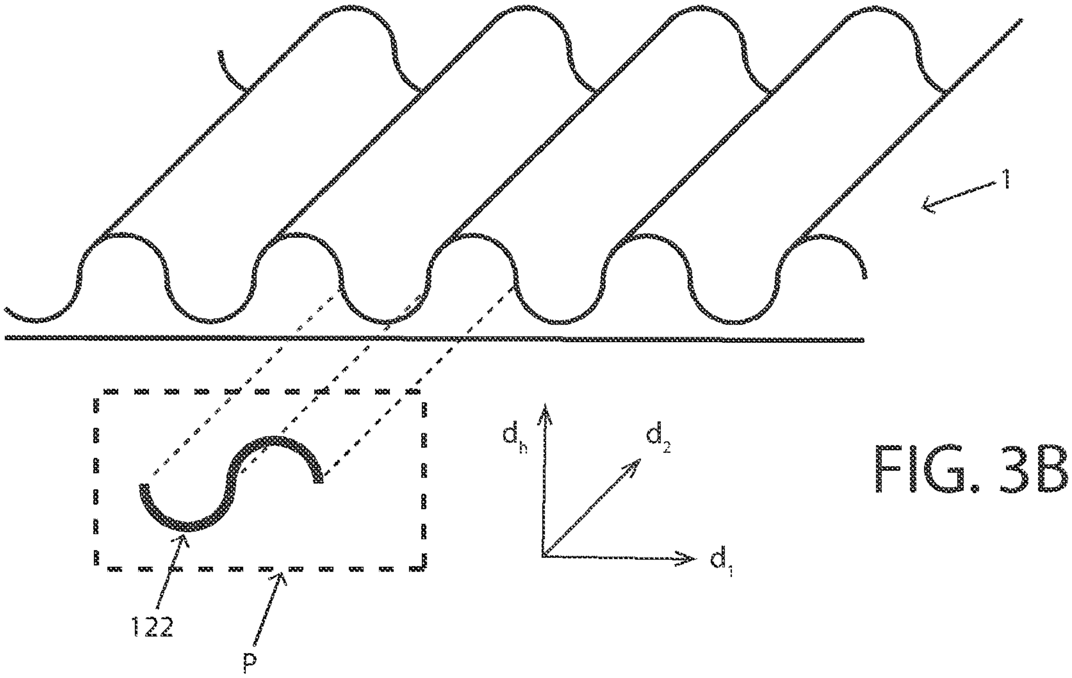

As a specific example, in FIG. 3A, a square-wave like shape 121 (e.g. of FIG. 2A wherein the inclination angle ∝ is 90°) may be used. This shape may be repeated in the first direction $d_1$ and extended in the second direction $d_2$ to form peaks and troughs (or valleys). Herein, the size of the height/width dimension may vary for each repetition of the shape to obtain an irregularly shaped spatially modulated surface structure 12. To better highlight the square-wave like shape 121, in FIG. 3A, it is projected from the cross-section onto a (virtual) plane P parallel to the cross-section. This example of FIG. 3A is, however, not limited to an inclination angle ∝ of 90° and one or more different angles as described above may also be possible. Further, the inclination angle ∝ may be changed for each repetition of the shape and/or along the extension of the shape to obtain an irregularly shaped spatially modulated surface structure 12.

Figure 4A:
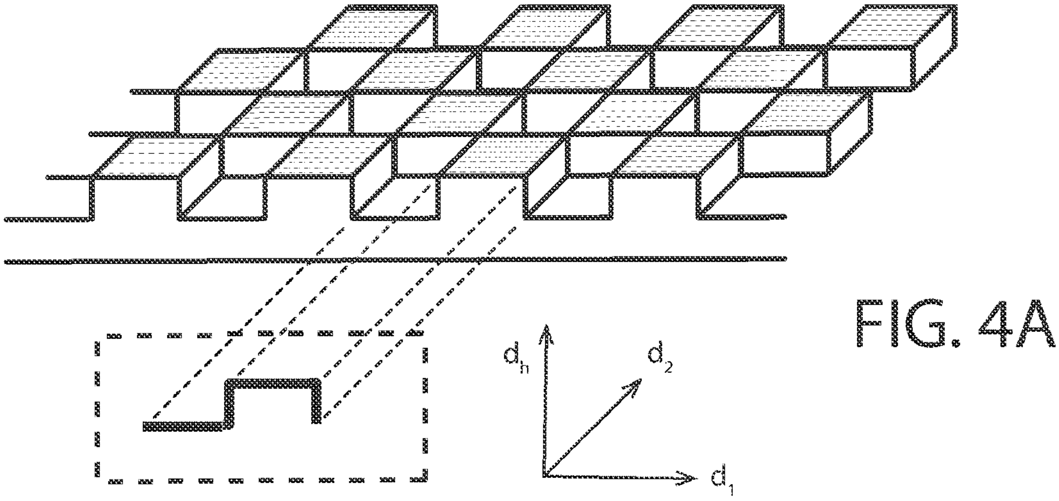
FIGS. 4A and 4B illustrate examples of radar systems according to embodiments of the present disclosure, wherein the surface structure is two-dimensionally repeated.

As another specific example, in FIG. 4A, a square-wave like shape (e.g. like in FIG. 2A and FIG. 3A) may be used. This shape may be repeated in the first direction $d_1$ and in the second direction $d_2$ to form peaks and troughs (or valleys). Thereby, a shape akin to a checkered pattern of rectangular protrusions and/or recesses may be obtained. Hence as a further preferred embodiment, at least some of the plurality of elements may have the similar (or same) shape and may be distributed (or repeatedly arrayed) across at least a portion of the (baseline) surface 10 of the radar system. Put differently, although e.g. FIG. 7A depicts concave hemispheres as elements that are repeatedly arrayed across the surface, when using differently shaped elements only a subset or a sub-group of elements may be repeatedly arrayed. For example, if both concave and convex hemispheres are used, elements may be repeatedly and alternatingly arrayed e.g. as depicted in FIG. 6A. It is, however, possible, to group together similarly shaped elements, to not have differently shaped elements alternate e.g. as depicted in FIG. 6A.

Further, although FIG. 3A depicts a repetition of the same square-wave-like shape in the first direction $d_1$ and an extension in the second direction $d_2$, the shapes may vary in height dimension, in width dimension and/or in actual shape. For example, the square-wave like shape (e.g. of FIG. 2A) may be combined with a sinusoidal shape (e.g. of FIG. 2B)

or any other shape to obtain an irregularly or regularly shaped spatially modulated surface structure 12.

Figure 10:
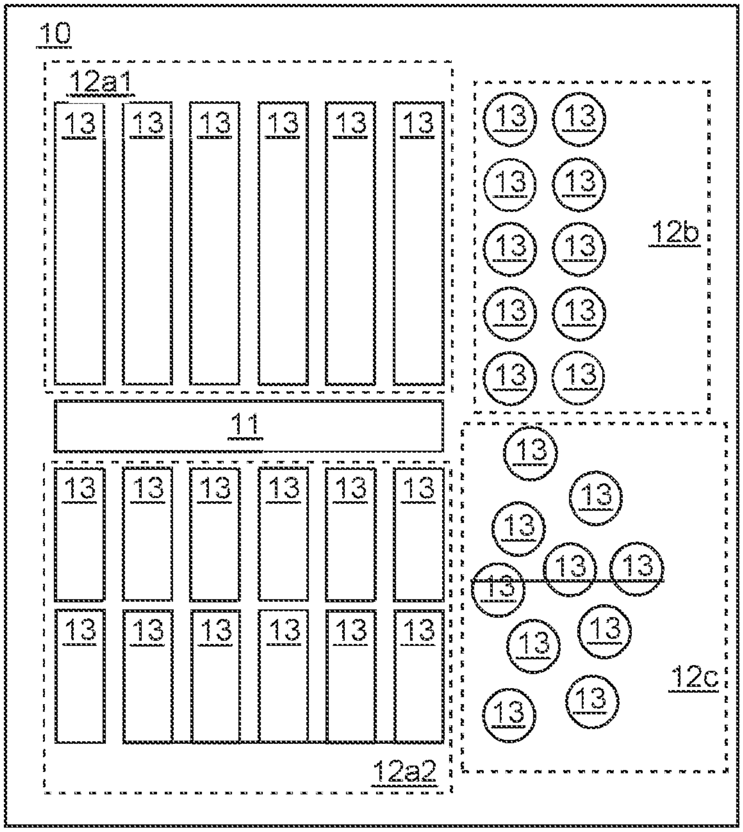
FIG. 10 illustrates an example of an antenna comprising a plurality of surface structures according to embodiments of the present disclosure.

For example, as depicted in FIG. 10 (a top-down view), the spatially modulated surface structure 12*b* has regularly arrayed hemispherical elements 13 and the spatially modulated surface structure 12*c* has irregularly distributed hemispherical elements 13. In FIG. 10, although the elements 13 of spatially modulated surface structures 12*a* and 12*b* are illustrated as having the same size and/or shape, they may be sized and/or shaped differently and are distributed across the baseline surface 10 in a regular or irregular manner.

Hence, as a further preferred embodiment, the at least one of the plurality of elements may extend along a predetermined direction along the baseline surface 10. Put differently, as shown in e.g. FIGS. 3A and 3B the element (described by a shape 121, 122) may be extended, stretched, extruded or elongated (collectively referred to as "extended" in this disclosure) in a direction $d_2$ to form a structure having a directionality. This directionality may be indicated by grooves and/or ridges resulting from the extending of the element. The direction of the extension may be any direction along (or parallel to) the baseline surface 10 and may preferably be the above-mentioned direction $d_2$ (e.g. a direction of the width dimension b). It is also conceivable to incline the predetermined direction towards (but not parallel to) the direction $d_1$, e.g. such that the predetermined direction is no longer parallel to the normal of plane P in FIGS. 3A and 3B.

As a further preferred embodiment, this predetermined direction may correspond to the (at least one) antenna structure 11, preferably, a polarization of the antenna structure 11. Put differently, if the element has a shape with a directionality, e.g. having a shape that is (from a top-down view onto the baseline surface 10) a longer dimension in one direction (e.g. a length direction or a direction into which the cross-sectional shape has been extruded) than in the another direction (e.g. a width direction or a direction parallel to a plane defining the cross-sectional shape), then the antenna structure 11 may be located at the end of the one longer dimension of the spatially modulated surface structure 12.

For example, as depicted in FIG. 10 (a top-down view), the spatially modulated surface structure 12*a*1 has extended elements 13 with a longer dimension in an up-and-down direction of FIG. 10. Herein, an antenna 11 may be located at the bottom end of the elements 13.

As a further preferred embodiment, the predetermined direction may correspond to a radiation direction of the (at least one) antenna structure 11. For example, in reference to FIG. 5C, if an antenna structure 11 radiates waves in the ±z direction (the 3d-axis indicated in FIG. 6C mutually applies to FIG. 5C for this example), the direction into which the element (e.g. having a sinusoidal cross-sectional shape) is extension may be along the z direction.

For example, as depicted in FIG. 10 (a top-down view), the spatially modulated surface structure 12*a*1 has extended sinusoidal elements 13 (or stretched hemispherical elements, being a preferred embodiment) that point in a direction towards (or away from) the antenna structure 11. If the antenna structure 11 emits radar waves in the up-and-down direction of FIG. 10, the extension directions of the elements 13 of the spatially modulated surface structure 12*a*1 correspond (or are parallel) to the radiation direction and/or the polarization of the antenna structure 11. As a result, the antenna's gain is not impacted by the spatially modulated surface structure, i.e. only reflections are impacted.

The extension of the elements 13 need not be continuous. For example, the spatially modulated surface structure 12*a*2 in FIG. 10 is constituted by two rows of a plurality of extended sinusoidal elements 13 (or stretched hemispherical elements, being a preferred embodiment). Herein, as long as the elements 13 are longer than wide when seen in a direction from the antenna structure 11 or its radiation direction or, as long as the resultant grooves or ridges define directions that correspond to the antenna structure 11 (including its polarization and/or radiation direction) as described above, the antenna's gain is not impacted, yet multi-bounce reflections are reduced.

In the example of FIG. 10, although the elements 13 of spatially modulated surface structures 12*a*2 and 12*a*2 are illustrated as spaced apart, they may be in contact with each other to form a continuous wave-like (sinusoidal or hemispherical) pattern in a left-to-right direction of FIG. 10. Also, in the example of FIG. 10 although the elements 13 of spatially modulated surface structures 12*a*2 and 12*a*2 are illustrated as having the same size and/or shape, they may be sized and/or shaped differently, either regularly or irregularly, as long as they are orientated in an up-and-down direction of FIG. 10.

The shape of the element/s of the spatially modulated surface structure 12 is, however, not limited to the square-wave like shape (or derivations thereof) described above and may be any other shape, too. For example, in FIG. 3B, a shape 122 of protruding and receding semi-circles (e.g. like in FIG. 2C) may also be used. As a result, and as mentioned above, a wave-like pattern may be obtained. Similarly, when applying a sinusoidal shape of FIG. 2B, a geometry as exemplified in FIG. 5A to 5C may be obtained.

With regard to FIG. 10, it is worth mentioning, that the individually designated spatially modulated surface structures 12*a*1, 12*a*2, 12*b* and 12*c* may be regarded as a single spatially modulated surface structures, covering an area of the baseline surface 10 not occupied by the antenna structure 11.

Figure 4B:
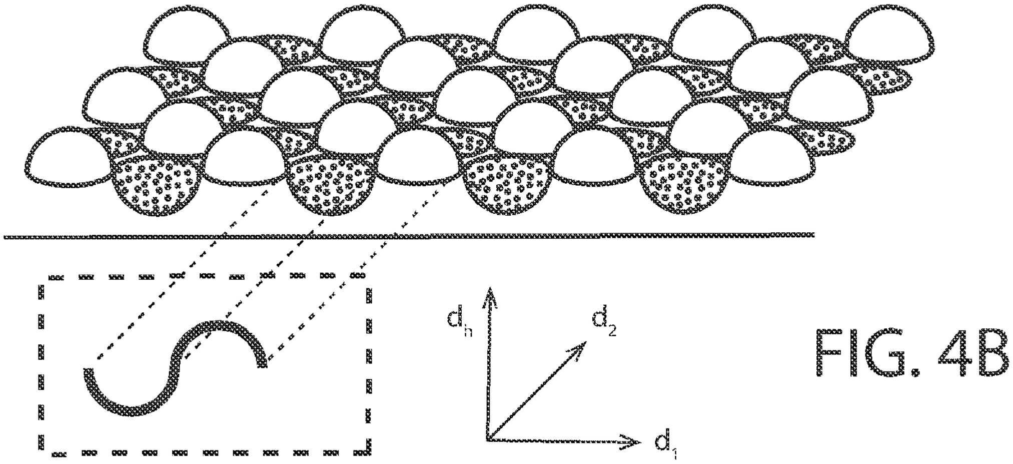

As another specific example, in FIG. 4B, a shape (e.g. like in FIG. 2C and FIG. 3B) may be used. This shape may be repeated in the first direction $d_1$ and in the second direction $d_2$ to form peaks and troughs (or valleys). Thereby concave hemispheres (dotted in FIG. 4B) and convex hemispheres (white in FIG. 4B) may be obtained that are spread over the surface 10 of the spatially modulated structure 12 (e.g. like the boards in FIG. 6A to 6C). Although the resulting hemispheres appear arranged in a gridded array over the surface 10, the arrangement may be random and/or irregular. That is to say, the two-dimensional positioning across the surface 10 and/or the width/height dimensions of each hemisphere may vary. Hence, as a further preferred embodiment, one or more of the plurality of elements may be a concave or convex hemisphere. As already mentioned above, only convex or only concave hemispheres may be provided as elements constituting the spatially modulated surface structure 12. For example, when simply omitting convex hemispheres and only providing concave hemispheres, boards 1*c* as exemplified in FIG. 7A to 7C may be obtained. Also, e.g. when components within the board may interfere with convex elements (such as a waveguide), only concave elements (such as the concave hemispheres) may be provided.

In FIGS. 3A to 4B, the second direction $d_2$ is essentially perpendicular to the first direction $d_1$. However, the two directions may also not be perpendicular, as long as they are not parallel. For example, they may be inclined at a certain angle, whereby the checkered pattern described above would be turned into a pattern of diamond-like shapes or rhombical shapes. Such a configuration may be preferable if the antenna structure 11 has a predetermined radiation pattern that must not be interfered with or for which certain reflections need to be avoided.

In summary, the shapes exemplified in FIGS. 3A to 4B are not limited thereto and only as a further preferred embodiment, a cross-sectional shape of each of the plurality of elements is a sinusoidal and/or another geometric shape. Herein, the other geometric (cross-sectional) shape may be that of a semi-circle 122, a triangle, a rectangle 121 or a trapezoid. A combination of any of these shapes is also possible. When using a cross-sectional shape as basis for the spatially modulated surface structure 12, the smallest component (e.g. a single wave of a sinusoid or of a square wave, or a single semi-circle or triangle) may constitute a single element.

Further, one or more of the plurality of elements may be a protruded or receded (semi-) circle or polygon. The latter may be beneficial if a perfect semi-circle cannot be produced and a polygon-like protrusion and/or recession is needed. However, triangular, star-like or any other two-dimensional polygon shape may be protruded or receded in a normal direction to obtain an element constituting the spatially modulated surface structure 12. A combination of any of these shapes is also possible.

Further, the interface between the protrusion or recession of the circle or polygon may be beveled or rounded. As a result, is not necessary to provide sharp edges along the protruding and/or receding elements. Thereby not only the danger of injury is reduced, but also collections of electrons at sharp edges are avoided.

To assure that a sufficient amount of the reflected waves is cancelled out, as a further preferred embodiment, the spatially modulated surface 12 may occupy at least 5% to 10% of the uncopied baseline surface 10 of the radar system. Put differently, an amount of the baseline surface 10 occupied by the spatially modulated surface structure 12 may be at least 10%, or preferably at least 20%, or more preferably at least 30%. After all, as the size of an antenna board used for the radar system increases, it is not essential that the entire remaining area (i.e. "free area") of the surface 10 of the radar system is covered by the spatially modulated surface structure 12. Nonetheless, it is preferable to cover as much surface as technically possible; e.g. to cover the entire area of the surface 10 not occupied by the antenna structure 11 with the spatially modulated surface structure 12. When using receding elements, the depth of the board may be of relevance too. For example, to not collide with components within the antenna board (e.g. a waveguide) or to not weaken the structural integrity of the board receding elements of the spatially modulated surface structure 12 (e.g. a concave hemisphere) may be omitted, scaled down or substituted by a protruding element (e.g. a convex hemisphere).

Regarding a choice for materials, as a further preferred embodiment, the surface of the spatially modulated surface 12 may be coated or plated in a metal, preferably copper and/or magnesium. For ease of manufacturing, the antenna structure 11 and the spatially modulated surface structure 12 may be coated or plated by the same material, but different materials may also be used.

The radar system described above may be mounted in a vehicle to support ADAS/ADS. Hence, another embodiment of the present disclosure is a vehicle comprising a radar system according to any one of the embodiments described above. The modifications described above, and their corresponding technical effects mutually apply.

The invention claimed is:

1. A radar system, comprising:

a structure comprising a first surface and a second surface, the first surface and the second surface being non-overlapping regions of a common plane;

at least one antenna structure occupying the first surface; and at least one spatially modulated surface occupying the second surface of the structure, wherein the at least one spatially modulated surface is configured to generate, from incident radar waves, a first portion of reflected waves and a second portion of reflected waves, wherein the first portion of reflected waves is out of phase in relation to the second portion of reflected waves, wherein the at least one spatially modulated surface comprises a plurality of elements, protruding and/or receding from a baseline surface of the radar system, and each element of the plurality of elements has a height or depth of at least 1 millimeter as measured from the baseline surface, and wherein the at least one spatially modulated surface is formed by a manufacturing technique suitable for producing three-dimensional shapes.

2. The radar system according to claim 1, wherein the first portion of reflected radio waves is reflected with a phase shift of $(2n-1)\times 180°$ with a tolerance of $\pm 90°$ compared to the second portion of reflected radio waves, where $n \in Z+$.

3. The radar system according to claim 1, wherein the at least one antenna structure is configured for emitting a signal of a predefined wavelength, $\lambda$; and wherein a spatial dimension of the plurality of elements is adapted to be within $(2n-1)\times\lambda/2$ of the predefined wavelength, where $n \in Z+$.

4. The radar system according to claim 1, wherein each of the plurality of elements has a predetermined shape that alternates and/or repeats along a predetermined direction on the baseline surface of the radar system.

5. The radar system according to claim 1, wherein a cross-sectional shape of at least some of the plurality of elements is a sinusoidal and/or another geometric shape.

6. The radar system according to claim 1, wherein at least one of the plurality of elements extends along a predetermined direction along the baseline surface.

7. The radar system according to claim 6, wherein the predetermined direction corresponds to a polarization of the at least one antenna structure.

8. The radar system according to claim 6, wherein the predetermined direction corresponds to a radiation direction of the at least one antenna structure.

9. The radar system according to claim 1, wherein one or more of the plurality of elements is a concave or convex hemisphere.

10. The radar system according to claim 1, wherein at least some of the plurality of elements have a same shape and are distributed across at least a portion of the baseline surface of the radar system.

11. The radar system according to claim 1, wherein at least some of the plurality of elements are repeatedly arrayed across at least a portion of the baseline surface of the radar system.

12. The radar system according to claim 1, wherein the at least one spatially modulated surface occupies at least 5-10% of the baseline surface of the radar system not occupied by the at least one antenna structure.

13. The radar system according to claim 1, wherein the at least one spatially modulated surface is made from, coated, or plated in a metal.

14. A vehicle comprising a radar system according to claim 1.

15. The radar system according to claim 1, wherein the at least one spatially modulated surface is a two-dimensional shape longer in a first dimension than in a second dimension, wherein the at least one antenna structure is positioned at the second dimension of the at least one spatially modulated surface, and wherein the at least one spatially modulated surface extends along a direction of transmission and/or polarization of the at least one antenna structure in the first dimension.

16. The radar system according to claim 2, wherein the phase shift is caused by the protruding and/or receding elements of the at least one spatially modulated surface.

* * * * *